US012710521B2

(12) United States Patent
Zhang et al.

(10) Patent No.: US 12,710,521 B2
(45) Date of Patent: Aug. 18, 2026

(54) LASER SURVEYING SYSTEM FOR SETTING OUT

(71) Applicant: CHANGZHOU HUADA KEJIE OPTO-ELECTRO INSTRUMENT, Changzhou (CN)

(72) Inventors: Ou Zhang, Changzhou (CN); Junichi Kodaira, Changzhou (CN); Zhu Weiping, Changzhou (CN)

(73) Assignee: CHANGZHOU HUADA KEJIE OPTO-ELECTRO INSTRUMENT CO., LTD, Changzhou (CN)

( * ) Notice: Subject to any disclaimer, the term of this patent is extended or adjusted under 35 U.S.C. 154(b) by 437 days.

(21) Appl. No.: 18/395,270

(22) Filed: Dec. 22, 2023

(65) Prior Publication Data

US 2024/0210540 A1 Jun. 27, 2024

(30) Foreign Application Priority Data

Dec. 27, 2022 (CN) ......................... 202211686031.8

(51) Int. Cl.
*G01S 7/497* (2006.01)
*G01C 15/00* (2006.01)
*G01S 7/481* (2006.01)
*G01S 17/18* (2020.01)

(52) U.S. Cl.
CPC .......... *G01S 7/4972* (2013.01); *G01C 15/004* (2013.01); *G01S 7/4814* (2013.01); *G01S 7/4816* (2013.01); *G01S 17/18* (2020.01)

(58) Field of Classification Search
None
See application file for complete search history.

(56) References Cited

U.S. PATENT DOCUMENTS 10,481,270 B2 * 11/2019 Maisonnier ........... G01S 17/931
2010/0073759 A1 * 3/2010 Kodaira ............... G01C 15/004 359/298
2021/0190492 A1 * 6/2021 Hajmousa ................ G01C 9/24

* cited by examiner

*Primary Examiner* — Hovhannes Baghdasaryan
(74) *Attorney, Agent, or Firm* — BRYAN CAVE LEIGHTON PAISNER LLP

(57) ABSTRACT

The present disclosure relates to the field of architecture and civil engineering, in particular to a construction surveying system. A laser surveying system for setting out comprises a horizontal laser emitter for emitting horizontal laser beams in a sector; a vertical laser emitter for emitting vertical laser beams in a sector; a leveling laser rangefinder; and at least one laser receiver; The horizontal and vertical laser beams in a sector intersect at an intersection line, an optical axis of ranging beams of the leveling laser rangefinder coincides with the intersection line, the laser receiver includes a laser entrance window and a laser plummet, and an axis of the laser entrance window coincides with the intersection line. According to the present disclosure, the aim direction of the laser emitter can be indicated for operators by the intersection line of the laser beams in a sector. The distance between the laser emitter and the laser receiver is measured by the laser rangefinder whose axis coincides with the intersection line, and the beams are projected onto a surface to be surveyed by the laser plummet of the laser receiver so that the aim direction can be indicated for operators easily regardless of sloping or uneven ground, and the operator can mark coordinates along on the laser beams.

12 Claims, 3 Drawing Sheets

LASER SURVEYING SYSTEM FOR SETTING OUT

CROSS-REFERENCE TO RELATED APPLICATIONS

The present application claims priority to Chinese Patent Application No. 2022116860318, filed on Dec. 27, 2022, the disclosure of which are incorporated herein by reference.

TECHNICAL FIELD

The present disclosure relates to the field of architecture and civil engineering, in particular to a construction surveying system.

BACKGROUND

Various types of surveying equipment are required for piping, wiring, arranging equipment and air conditioners in buildings, such as total stations and laser scanners for 3D point setting and 3D surveying, and other laser devices such as flip lasers and line lasers.

In the 3D point setting-out technology for surveying and setting out on the floor and the total station technology, robot total stations without special telescopes for construction and laser rangefinders in online lasers are required. For example, two types of working systems are disclosed in patents EP2020210557 and EP2019157547, respectively.

So far, all these surveying products are designed by modifying the structure of total stations or laser scanners, making these products complex and expensive to use.

In addition, when setting out points on the ground and ceiling, datum points for construction cannot be directly projected due to uneven ground and ceiling. For example, during setting out, if setting-out points are designed on an inclined plane that is difficult for drilling, construction points are hard to detect in practice even though these points are moved to portions accessible for construction. Especially in the marking, surveying, and actual construction of uneven ground and top surfaces before burying with concrete, it is difficult for an operator to reflect the change of construction data in practical construction works in real time.

SUMMARY

According to the present disclosure, a laser surveying system for setting out is provided. With this surveying system, the aim direction of the laser emitter can be indicated for operators by the intersection line of the laser beams in a sector. The distance between the laser emitter and the laser receiver is measured by the laser rangefinder whose axis coincides with the intersection line, and the beams are projected onto a surface to be surveyed by the laser plummet of the laser receiver so that the aim direction can be indicated for operators easily regardless of sloping or uneven ground, and the operator can mark coordinates along on the laser beams. The system can record all of the above positions during setting out and make the construction data always meet the site conditions.

According to the present disclosure: a laser surveying system for setting out is provided, comprising

- a horizontal laser emitter for emitting horizontal laser beams in a sector;
- a vertical laser emitter for emitting vertical laser beams in a sector;
- a leveling laser rangefinder;

- and at least one laser receiver;
- the horizontal and vertical laser beams in a sector intersect at an intersection line, an optical axis of ranging beams of the leveling laser rangefinder coincides with the intersection line, the laser receiver includes a laser entrance window and a laser plummet, and an axis of the laser entrance window coincides with the intersection line.

The horizontal and vertical laser beams in a sector have the same wavelength; the wavelength of the ranging beams is different from that of the horizontal and vertical laser beams in a sector.

The horizontal and vertical laser beams in a sector are turned on/off at the same time; the ranging beams and the horizontal and vertical laser beams in a sector are turned on/off at different times.

Several laser receivers, of which laser entrance windows are arranged in order along the intersection line, are provided.

It further comprising a housing, wherein the horizontal laser emitter, the vertical laser emitter and the leveling laser rangefinder are mounted in the housing mounted on a suspension frame.

The laser plummet comprises a laser emitting unit, a projection lens, a motor, and a rotating table; the projection lens is mounted on the rotating table, the motor drives the rotating table to rotate, and the rotating table monitors the angle of the projection lens.

A central axis of the rotating table is in a plane where vertical laser beams in a sector are formed.

The laser receiver is provided on a support platform that can be adjusted freely in levelness and verticality.

A verticality calibration sensor for vertical laser beams in a sector is further provided in the laser receiver and is a wedged beam sensor.

A data communication module is further provided in the laser receiver.

According to the present disclosure, with this surveying system, the aim direction of the laser emitter can be indicated for operators by the intersection line of the laser beams in a sector. The distance between the laser emitter and the laser receiver is measured by the laser rangefinder whose axis coincides with the intersection line, and the beams are projected onto a surface to be surveyed by the laser plummet of the laser receiver so that the aim direction can be indicated for operators easily regardless of sloping or uneven ground, and the operator can mark coordinates along on the laser beams. The system can record all of the above positions during setting out and make the construction data always meet the site conditions.

Figure 1:
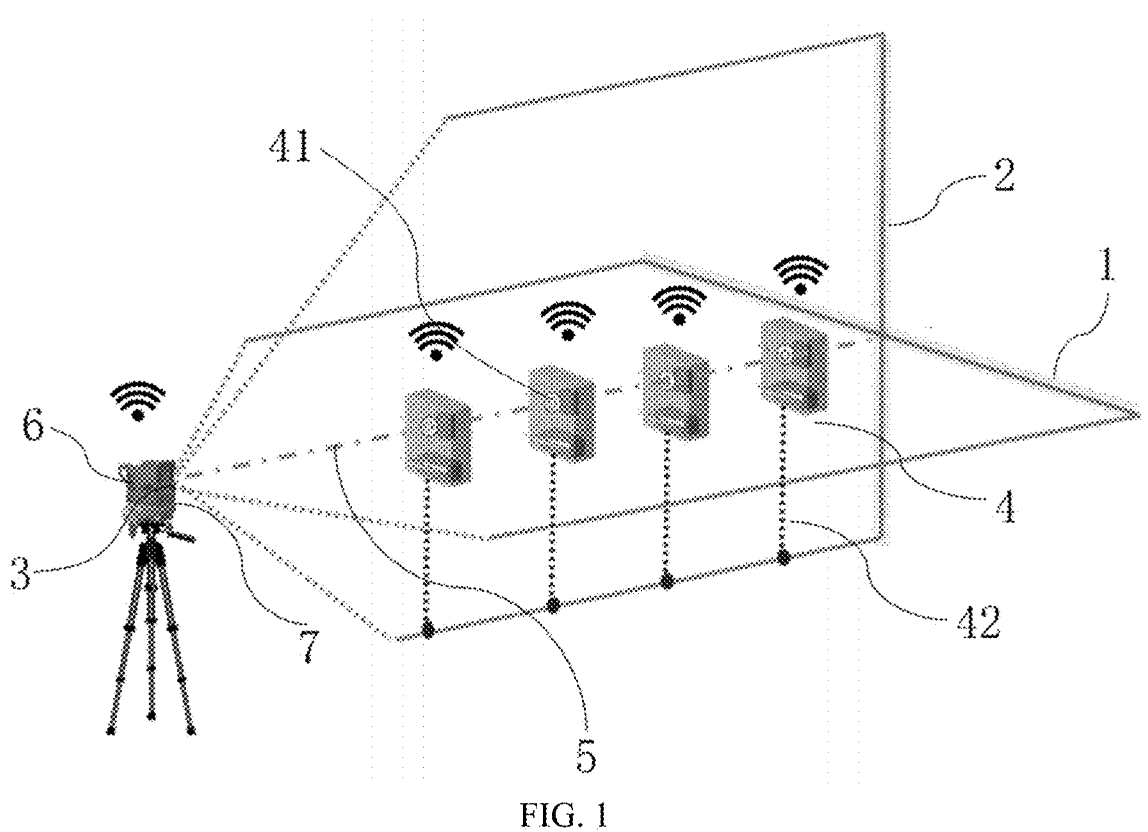
FIG. 1 is a topology of a laser surveying system for setting out according to the present disclosure.

In the drawings: 1: Horizontal laser emitter; 2: Vertical laser emitter; 3: Laser rangefinder; 4: Laser receiver; 5: Intersection line; 6: Housing; 7: Suspension frame; 41: Laser entrance window; 42: Laser plummet; 43: Data communication module; 44: Verticality calibration sensor; 45: Tilt sensor; 421: Laser emitting unit; and 422: Projection lens.

DETAILED DESCRIPTION

The present disclosure will be further described below with reference to embodiments. It should be noted that these embodiments are not intended to define the scope of the present disclosure but merely to describe the present disclosure. In addition, it should be understood that those of skill in the art can make various alterations or modifications to the present disclosure after reading the present disclosure, and these equivalent forms shall also fall within the scope defined by the claims appended to the present disclosure.

Embodiment 1

As shown in FIG. 1, a laser surveying system for setting out is provided, including a horizontal laser emitter 1, a vertical laser emitter 2, a leveling laser rangefinder 3, and at least one laser receiver 4. The horizontal laser emitter 1 is configured to emit horizontal laser beams in a sector, and the vertical laser emitter 2 is configured to emit vertical laser beams in a sector. The horizontal and vertical laser beams in a sector intersect at an intersection line 5, an optical axis of ranging beams of the leveling laser rangefinder 3 coincides with the intersection line 5, the laser receiver 4 includes a laser entrance window 41 and a laser plummet 42, and an axis of the laser entrance window 41 coincides with the intersection line 5.

In the present disclosure, the position of the horizontal laser emitter 1, the vertical laser emitter 2, and the leveling laser rangefinder 3 may be subject to error, given the presence of mechanical precision in practice. In order to make it easy for the user to identify the error and make adjustments to the error, in this embodiment, the horizontal and vertical laser beams in a sector have the same wavelength; the wavelength of the ranging beams is different from that of the horizontal and vertical laser beams in a sector.

As another embodiment, the horizontal and vertical laser beams in a sector are turned on/off at the same time; the ranging beams and the horizontal and vertical laser beams in a sector are turned on/off at different times.

According to the actual use requirements, several laser receivers 4, of which laser entrance windows 41 are arranged in order along the intersection line 5, are provided in the present disclosure.

The present disclosure may further be described as follows. A housing 6, in which the horizontal laser emitter 1, the vertical laser emitter 2 and the leveling laser rangefinder 3 are mounted, is provided. The housing 6 is mounted on a suspension frame 7, and the suspension frame 7 can keep the housing 6 upright to facilitate the positioning and alignment of other components in the housing. The horizontal laser emitter 1 and the vertical laser emitter 2 can maintain their posture with a tilt sensor that detects verticality or levelness, and the posture can be corrected with a motor for automatic control.

Figure 2:
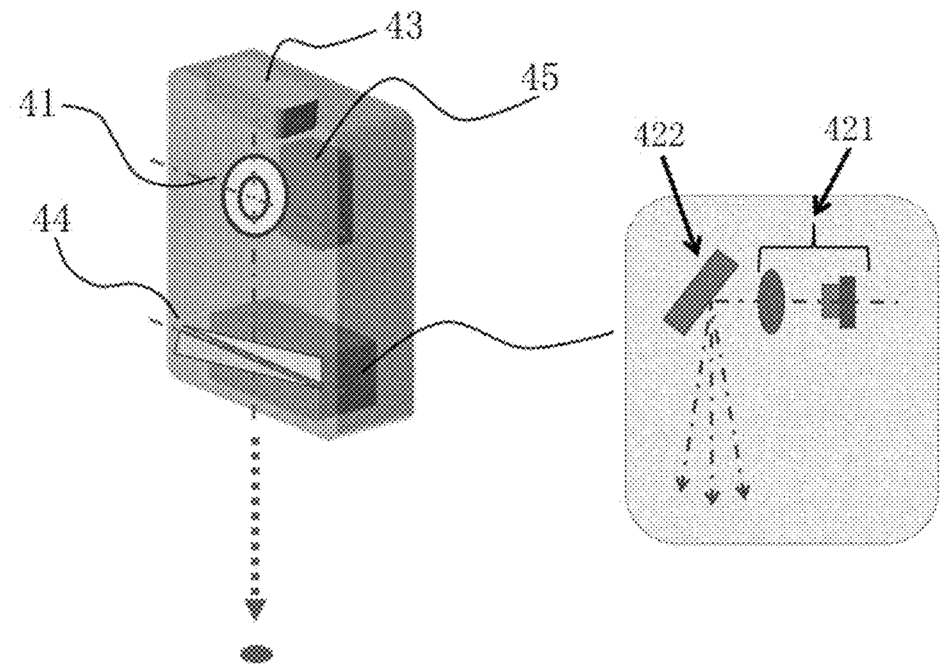
FIG. 2 is a structural schematic diagram of a laser receiver according to the present disclosure.

As shown in FIG. 2, the laser receiver 4 further includes a data communication module 43, a verticality calibration sensor 44, and a tilt sensor 45 in the present disclosure. The data communication module 43 is configured to feed measured drawing data to other shared spaces, such as other terminals, online hybrid environments, and cloud environments. The verticality calibration sensor 44 and the tilt sensor 45 are configured to calibrate the posture of the laser receiver 4, enabling the operator to align the axes of the laser emitter and the laser receiver by adjusting positions even on a construction site with uneven ground.

The laser plummet 42 comprises a laser emitting unit 421, a projection lens 422, a motor, and a rotating table. The projection lens is mounted on the rotating table, the motor drives the rotating table to rotate, and the rotating table monitors the angle of the projection lens. Laser beams emitted by the laser plummet 42 are projected onto a surface to be surveyed after passing through the projection lens. The laser plummet 42 adjusts the projection lens with the motor to deflect the axis of ranging beams emitted by the laser plummet 42 and project the beams onto the ground. By deflecting the axis of ranging beams with the projection lens, vertical beams can be projected onto both the ground and the ceiling, and setting-out points on the ground can also be easily projected onto the ceiling, so as to meet the needs of multi-functional projection. In one laser receiver 4, there may be one or multiple sets of the laser plummet 42 and its associated laser emitting unit 421, the projection lens 422, the motor and the rotating table, to meet the needs of omnidirectional projection.

In this embodiment, preferably, a central axis of the rotating table is in a plane where vertical laser beams in a sector are formed.

Figure 3:
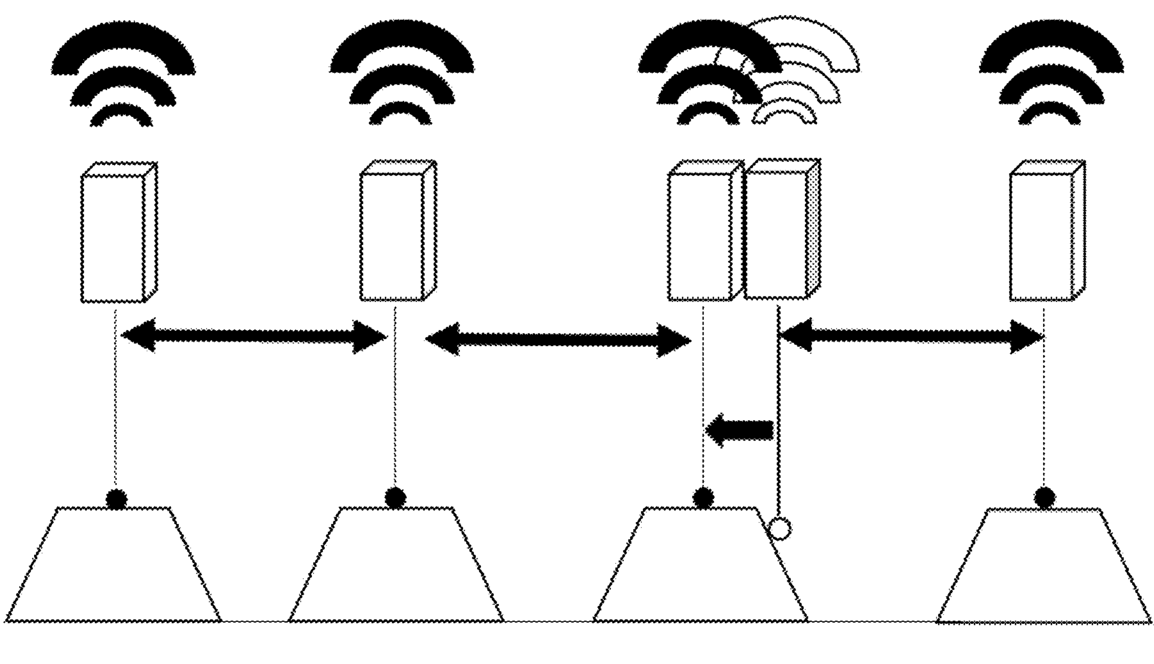
FIG. 3 is a schematic diagram of projections of uneven surfaces by the laser receiver according to the present disclosure.

As shown in FIG. 3, this setting-out point is usually used for positioning boreholes. After burying with concrete, the setting-out point is projected on any part of a flat concrete surface, and a hole is drilled after the setting-out point is marked. However, drilling is not allowed before burying with concrete if there are portions accessible for construction on inclined planes such as uneven iron plates, and standard deck plates for construction. Therefore, the operator needs to move markers to a flat surface on the spot.

Figure 4:
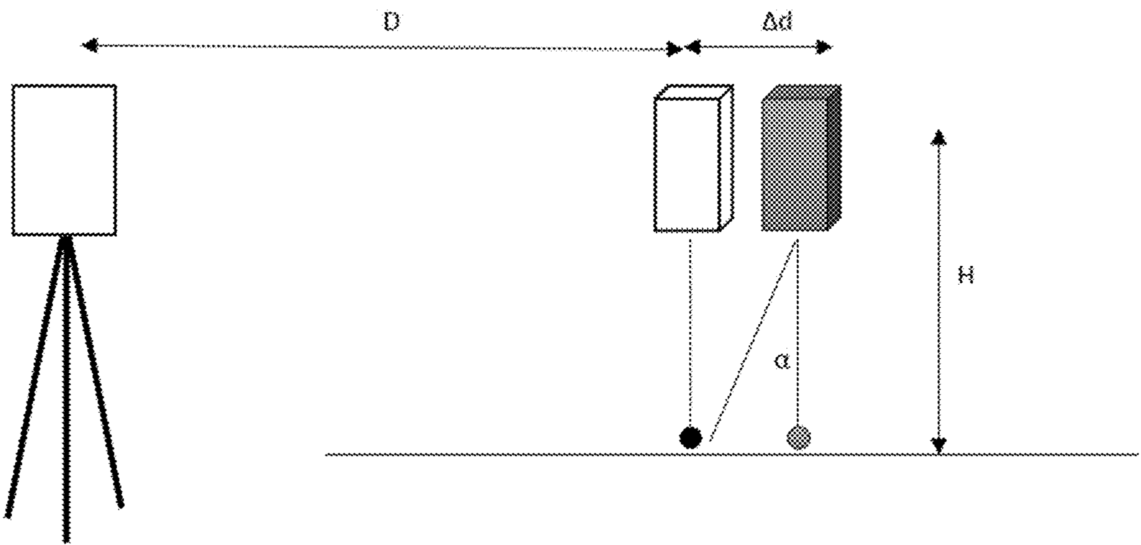
FIG. 4 is a schematic diagram of the laser receiver on a tripod according to the present disclosure.
Figure 5:
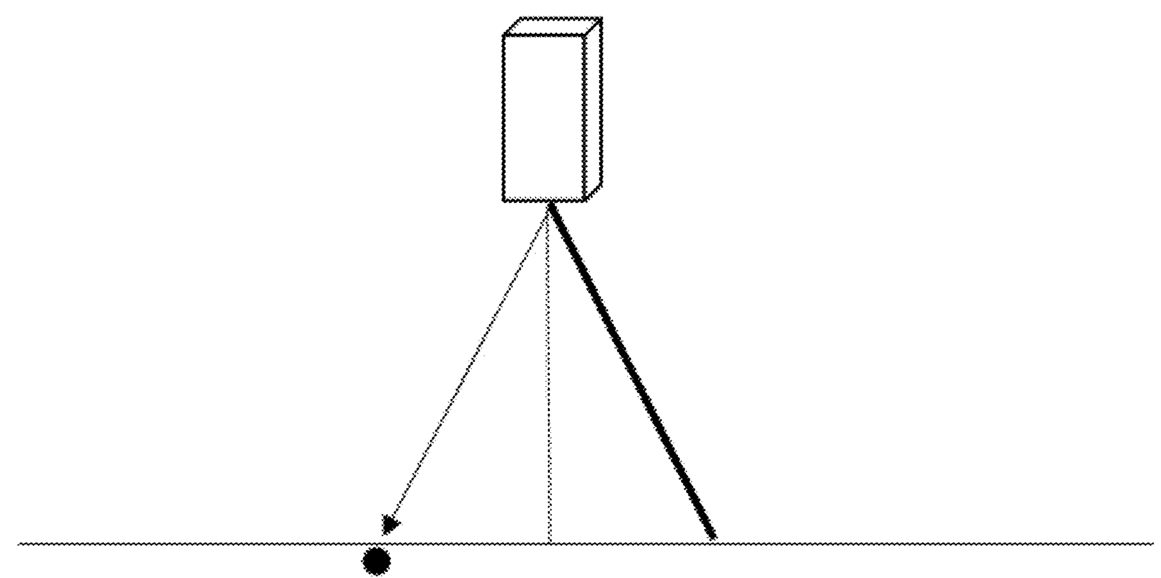
FIG. 5 is a schematic diagram of the laser receiver on a monopod according to the present disclosure.

As shown in FIGS. 4 and 5, the laser receiver 4 is provided on a support platform that can be adjusted freely in levelness and verticality, to facilitate the position adjustment of the laser receiver 4, and the support platform is preferably a monopod or tripod.

To change a projection point, there may be no need to move the laser receiver 4. Height H is calculated from a deviation value ΔD of the distance D between the leveling laser rangefinder 3 and the laser receiver 4 and a measured value of the laser plummet 42. Even though the laser receiver 4 is not moved directly above a preset setting-out point, the setting-out point can be tracked for projection by adjusting an angle of deflection a of the projection lens.

$$\alpha = \tan - 1(\Delta d/H\}$$

Figure 6:
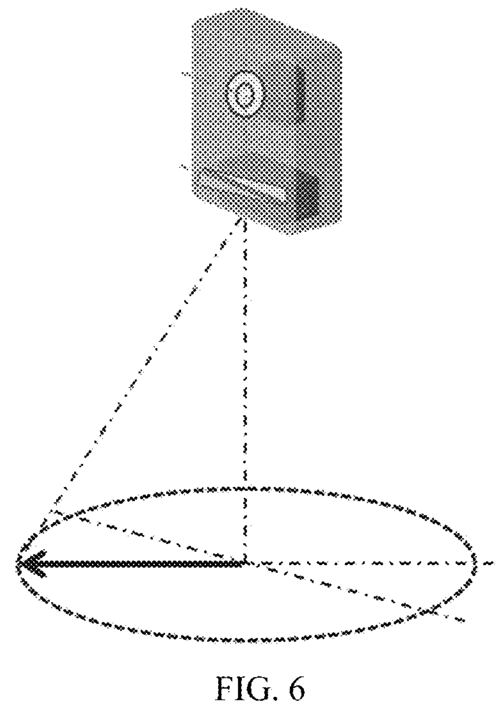
FIG. 6 is a schematic diagram of a verticality calibration sensor according to the present disclosure.

Further, as shown in FIG. 6, a verticality calibration sensor 44 for vertical laser beams in a sector is further provided in the laser receiver 4 and is a wedged beam sensor, enabling the operator to align the axes of the laser emitter and the laser receiver by adjusting positions even on a construction site with uneven ground.

The present disclosure can be further described as follows. A data communication module 43 is further provided in the laser receiver 4. When the operator moves the position of the laser plummet 42 from an inclined surface to a flat surface for marking points, the laser receiver 4 can record position deviations from those in construction drawings on the spot, and emit the deviations through the data communication module 43 to instruct the operator to change construction positions based on the deviations. Here, the above construction drawings are not input to the laser receiver but fed to drawings provided in other shared spaces, such as other terminals, online hybrid environments, and cloud environments. Of course, the spaces are environments that can be shared by operators in real time.

The invention claimed is:

1. A laser surveying system for setting out, wherein, comprising:

a horizontal laser emitter for emitting horizontal laser beams in a sector;

a vertical laser emitter for emitting vertical laser beams in a sector, a leveling laser rangefinder;

at least one laser receiver;

the horizontal and vertical laser beams in a sector intersect at an intersection line, an optical axis of ranging beams of the leveling laser rangefinder coincides with the intersection line, the laser receiver comprises a laser entrance window and a laser plummet, and an axis of the laser entrance window coincides with the intersection line.

2. The laser surveying system for setting out of claim 1, wherein the horizontal and vertical laser beams in a sector have the same wavelength; the wavelength of the ranging beams is different from that of the horizontal and vertical laser beams in a sector.

3. The laser surveying system for setting out of claim 1, wherein the horizontal and vertical laser beams in a sector are turned on/off at the same time; the ranging beams and the horizontal and vertical laser beams in a sector are turned on/off at different times.

4. The laser surveying system for setting out of claim 1, wherein several laser receivers, of which laser entrance windows are arranged in order along the intersection line, are provided.

5. The laser surveying system for setting out of claim 4, wherein further comprising a housing, wherein the horizontal laser emitter, the vertical laser emitter and the leveling laser rangefinder are mounted in the housing mounted on a suspension frame.

6. The laser surveying system for setting out of claim 4, wherein the laser plummet comprises a laser emitting unit, a projection lens, a motor, and a rotating table; the projection lens is mounted on the rotating table, the motor drives the rotating table to rotate, and the rotating table monitors the angle of the projection lens.

7. The laser surveying system for setting out of claim 6, wherein a central axis of the rotating table is in a plane where vertical laser beams in a sector are formed.

8. The laser surveying system for setting out of claim 6, wherein the laser receiver is provided on a support platform that can be adjusted freely in levelness and verticality.

9. The laser surveying system for setting out of claim 6, wherein a verticality calibration sensor for vertical laser beams in a sector is further provided in the laser receiver and is a wedged beam sensor.

10. The laser surveying system for setting out of claim 6, wherein a data communication module is further provided in the laser receiver.

11. The laser surveying system for setting out of claim 2, wherein several laser receivers, of which laser entrance windows are arranged in order along the intersection line, are provided.

12. The laser surveying system for setting out of claim 3, wherein several laser receivers, of which laser entrance windows are arranged in order along the intersection line, are provided.

* * * * *